UNITED STATES PATENT OFFICE.

CONRAD SCHRAUBE AND CARL SCHMIDT, OF LUDWIGSHAFEN, GERMANY, ASSIGNORS TO THE BADISCHE ANILIN AND SODA FABRIK, OF SAME PLACE.

NITROSAMIN COMPOUND.

SPECIFICATION forming part of Letters Patent No. 531,977, dated January 1, 1895.

Application filed July 30, 1894. Serial No. 519,027. (Specimens.) Patented in France November 13, 1893, No. 234,029.

*To all whom it may concern:*

Be it known that we, CONRAD SCHRAUBE and CARL SCHMIDT, doctors of philosophy, both subjects of the King of Prussia, German Emperor, residing at Ludwigshafen-on-the-Rhine, in the Kingdom of Bavaria and Empire of Germany, have invented new and useful Improvements in the Manufacture of a Nitrosamin Compound Derived from Dianisidin, (for which a patent has been obtained in France, dated November 13, 1893, No. 234,029, certificat d'addition of June 11, 1894,) of which the following is a specification.

In the production of certain shades of color by means of one well-known process the dyer combines diazo-compounds with amins or phenols on or in the presence of the fiber itself. Now since the diazo-compounds generally are an extremely unstable class of bodies, it is necessary that they should be prepared in the dyeing factory as they cannot practically be transported. The preparation of the diazo-compounds for the purpose in question is frequently an inconvenient or difficult matter as the best result can only be attained by careful and accurate observance of certain narrowly bounded conditions. Moreover the conditions which are best for obtaining the diazo-compounds sometimes yield these bodies admixed with acids and salts in such quantity that the product is not well suited for use in the dyeing process mentioned.

We have discovered that on treating diazo-compounds such as are hereinafter more particularly defined with caustic alkalies they are converted ultimately into the alkali-salts of the isomeric nitrosamins which compounds can easily be isolated and possess considerable stability. These constitute a new class of compounds and are characterized by the following generic properties: They are soluble in water, giving a somewhat alkaline solution and yield practically no dye in aqueous solution with a solution of naphthol in an excess of alkali. By treatment with the equivalent proportion of an acid these alkali-salts in some cases are converted into the free nitrosamin which is less stable than the alkali salt but can in some cases if desired be prepared in the solid state and used in the form of paste. On treatment with a larger proportion of acid preferably in the presence of a little nitrous acid, the bodies of this new class are smoothly and readily reconverted into the corresponding diazo-compounds. Thus by the aid of our invention it is possible to prepare stable compounds capable of transport which can easily be converted into diazo-compounds ready for use in the aforesaid dyeing process. Further in addition to these advantages mentioned our new nitrosamins can be used in entirely new ways for the production of dyes on the fiber. For this purpose the nitrosamin in the form of salt is mixed with beta-naphthol or other suitable component and this mixture is printed on the fiber and the color developed by means of a weak acid such as acetic acid or the carbonic acid of the atmosphere. In some cases this application constitutes the principal use of our new nitrosamins.

The processes above described for the production of our new nitrosamins can be applied to a large variety of diazo-compounds. The conversion into nitrosamin is most easily effected in the case of the diazo-compounds which contain one or more acid substituting groups such as nitro-groups or two or more halogens and the like. Thus for instance the diazo-compounds from the nitro-anilins, dichloro-anilin, nitro-benzidin and the like can be converted into the corresponding nitrosamins of the new class by treatment with caustic soda at the ordinary temperature. On the other hand the diazo-compounds from anilin, toluidin, naphthylamin, benzidin and the like which contain no acid substituting groups must be heated with strong alkalies at the temperature of the water-bath or higher in order to effect the desired conversion. Between these two extreme groups of diazo-compounds there are ranked sulfoacids and all such diazo-compounds as contain on the whole less strongly acid substituting groups than those first mentioned such for instance as the diazo-compounds from sulfanilic acid, para-brom-anilin and the like, and these can be converted into the nitrosamin of the new class by treatment with caustic alkali at a temperature intermediate to that preferably employed when using diazo-compounds belonging to the extreme groups previously referred to.

We have discovered that speaking generally the temperature required for the conversion of diazo-compounds into our new nitrosamin compounds varies according to the acidity of the substituting groups; the conversion being the more readily effected the more strongly acid an effect these are capable of producing under the circumstances of the reaction.

By this specification we do not intend to claim generally the nitrosamins resulting from the treatment of the diazo-compounds herein defined with caustic alkalies but to claim the specific nitrosamin (both in the form of salt and in the free state) derived from dianisidin.

The following example will serve to illustrate the manner in which our invention can best be carried into practical effect and our new nitrosamin obtained from dianisidin.

*Example. Production of a nitrosamin from tetrazodiphenyl.*—Mix thoroughly about eighty (80) parts of dianisdin with about two hundred and forty (240) parts of hydrochloric acid (containing about twenty-eight per cent. (28%) of real acid HCl. Cool the mixture by external cooling to about minus five degrees centigrade (−5° C.). Then add about one hundred and twenty (120) parts of powdered ice and diazotize by adding about fifty (50) parts of solid sodium nitrite. Filter the tetrazo-solution so obtained and allow it to run slowly into a mixture of five hundred (500) parts of caustic soda lye containing about thirty-five per cent. (35%) of sodium hydrate with about one hundred and fifty (150) parts more of solid caustic soda. Stir the solution thoroughly while running in the tetrazo-solution and keep it cool by external cooling. The temperature must not ever exceed about ten degrees centigrade (10° C.). During the operation about one hundred and fifty (150) parts more of caustic soda are added gradually to the mixture. A pasty mixture is so obtained. In the meantime prepare a mixture of about two hundred (200) parts of solid caustic soda and about two hundred (200) parts of caustic soda lye containing about thirty-five per cent. (35%) NaOH and heat this mixture directly to about one hundred and forty to one hundred and fifty degrees centigrade (140° to 150° C.). Add the pasty mass obtained as above described gradually to this hot solution while constantly stirring. Add gradually during the operation also four hundred (400) parts of caustic soda or sufficient to render it easy to maintain the temperature between one hundred and forty and one hundred and fifty degrees centigrade (140° to 150° C.). When no tetrazo-compound can be recognized by testing with sodium naphtholate solution, allow the mixture to cool to about one hundred degrees centigrade (100° C.) and then dilute with sufficient water to render it possible to filter off the caustic liquor from the formed nitrosamin-salt. Filter hot, collect the nitrosamin-salt, press and dry at a temperature of about fifty degrees centigrade (50° C.).

Our new nitrosamin from dianisidin possesses all the generic properties of the new class of nitrosamins hereinbefore set forth, and it occurs as a yellowish paste or powder soluble in water. On treatment with an excess of acid particularly in the presence of a trace of nitrous acid it is converted into tetrazo-dianisidin and it is further characterized by yielding a blue color when brought together with sodium beta-naphtholate on the fiber and subsequently to the air. The development of the color takes place quickly.

Now, what we claim is—

The new nitrosamin which in the form of sodium salt can be derived from tetrazo-dianisidin, both in the free state and as salt, which in the form of sodium salt occurs as a yellowish powder or paste soluble in water giving a slightly alkaline solution, on treatment with an excess of acid particularly in the presence of nitrous acid it is converted into tetrazo-dianisidin and on bringing it together with sodium-beta-naphtholate on the fiber and exposing to the air, blue shades of color are rapidly produced.

In testimony whereof we have hereunto set our hands in the presence of two subscribing witnesses.

CONRAD SCHRAUBE.
CARL SCHMIDT.

Witnesses:
ERNEST F. EHRHARDT,
ADOLPH REUTLINGER.